March 16, 1965 R. C. PAULSEN ETAL 3,174,049
LOGICAL DEVICE
Filed Sept. 23, 1958

INVENTORS
ROBERT C. PAULSEN
ALLAN A. KAHN
BY William V Schelberg
AGENT

United States Patent Office 3,174,049
Patented Mar. 16, 1965

3,174,049

LOGICAL DEVICE

Robert C. Paulsen, Poughkeepsie, and Allan A. Kahn, Bronx, N.Y., assignors to International Business Machines Corporation, New York, N.Y., a corporation of New York Filed Sept. 23, 1958, Ser. No. 762,821
8 Claims. (Cl. 307—88)

This invention relates to logical switching devices and more particularly to logical pulse switching devices wherein magnetic bistable components are employed.

Magnetic bistable components are employed throughout the computer art to perform logical operations on binary information, and this invention is directed to two such operators, one of which is an Exclusive OR device, and the other of which is an Equals device. In this respect, an Exclusive OR device may be defined as having two input terminals and one output terminal at which an output signal is provided only when one or another input terminal is energized by an input signal, while an Equals device may be defined as having two input terminals and one output terminal at which an output signal is provided only when there is absence of signal input to the input terminals or when both input terminals are simultaneously energized.

Accordingly, it is then an object of this invention to provide a new and improved magnetic device adapted to perform logic on binary information which employs magnetic bistable components.

Another object of this invention is to provide a new and improved Exclusive OR device which employs magnetic bistable components.

Still another object of this invention is to provide a new and improved Equals device.

These and other objects are accomplished by constructing a device in accordance with this invention wherein first and second bistable magnetic cores are provided, each having input, output and shift winding means thereon. A first set of input windings comprising an input winding on each of the cores are serially connected to provide a first input circuit and a second set of input windings comprising further input winding on each of the cores are similarly serially connected to provide a second input circuit. The output winding means on each core are serially connected in opposite sense, and the second core is biased to one of the bistable states. The first core is adapted to be switched when any one, or both, of the input windings is energized, while the second core is adapted to be switched only when both input windings are simultaneously energized. Thus, in effect, the first core represents an OR device, while the second core represents an AND device. Since the output windings on the cores are serially connected and opposed, an output signal is provided only when either one or the other input circuit is energized. By a further provision of an inversion device, here a storage core coupled to the output winding means on the first and second cores which provides a signal in the absence of a signal output from the serially connected output windings, the inverse of the signal output provided by the first and second cores as originally described is accomplished.

Other objects of this invention will be pointed out in the following description and claims and illustrated in the accompanying drawings, which disclose, by way of example, the principle of the invention and the best mode, which has been contemplated, of applying that principle.

In the figures.

Figure 1:
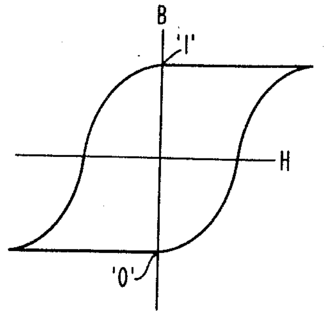
FIG. 1 is a representation of the hysteresis characteristic obtained for the magnetic material herein employed.

Referring to FIG. 1, the curve illustrates a plot of flux density (B) versus applied field (H) for a magnetic core having a substantially rectangular hysteresis characteristic. The opposite remanence states are conventionally employed for representing binary information conditions and are arbitrarily designated as "0" and "1." Because of these two possible remanence states of the core, it may be described as bistable. One of these states may be referred to as a "datum" state, and the other as an "information representative" state. With a zero stored, a pulse applied to a winding linking the core in proper sense causes the loop to be traversed and the remanence state "1" is attained when the pulse terminates. Such a pulse is hereinafter referred to as a "write" pulse. Similarly, the core is read out or returned to the "0" state in determining what information has been stored by applying a pulse in the reverse sense to the same or another winding. Such a pulse is hereinafter referred to as a "read" pulse. Should a "1" have been stored, a large flux change occurs, with the shift from "1" to "0" conditions with a corresponding voltage magnitude developed on the output winding. On the other hand, should an "0" have been stored, little flux change occurs in response to a read pulse and negligible signal is developed on the output winding.

A dot is shown adjacent to one terminal of each of the windings indicating its winding direction. A write pulse is a positive pulse which is directed into the undotted end of the winding terminal which tends to store a "1," while a read pulse is a positive pulse directed into the dotted end of the terminal and tends to apply a negative magnetomotive force, or store an "0."

The arrangements disclosed employ input and output coupling magnetic cores arranged intermediate to so called storage cores which store certain logical information. These arrangements are adapted to be interconnected with each other and similar type circuitry through such coupling cores. The coupling cores may be fabricated of materials like the storage or memory cores, however, it is not essential that these cores exhibit the rectangular hysteresis characteristic required of the storage core, but should have a good *Br/Bs* ratio, as these devices function as variable impedance elements in controlling the transfer of information pulses, as will be more evident in the following description. Such interconnecting coupling cores are illustrated in the circuits and labeled $C_{or}$, $C_{and}$, and $C_0$ for clarity.

Also shown are storage cores labeled S which are adapted to store information received. The cores S are adapted to deliver information received through the coupling core $C_0$ to other logical circuitry coupled therewith.

Referring now to the FIG. 2 in detail, the core S is provided with a control winding 10, which is adapted to act as both input and output winding, interconnected with an output winding 12 on the core $C_{and}$, and output winding 14 on the core $C_{or}$, and an input winding 16 on the core $C_0$ through a resistor R, which interconnection will hereinafter be referred to as loop A. Inputs are applied to the circuit by means of an input winding 18 on the core $C_{or}$ serially connected with an input winding 20 on the core $C_{and}$, having terminals 22 and 24, and an input winding 26 upon the core $C_{or}$ serially connected with an input winding 28 on the core $C_{and}$ having the terminals 30 and 32, while outputs are obtained from the circuit by means of an output winding 34 on the core $C_0$. The core $C_{and}$ is energized by a clock pulse source $I_A$, the cores $C_{or}$ and $C_{and}$ are energized by a clock pulse source $I_{RA}$, the cores $C_{or}$ and S are energized by a clock pulse source $I_B$, while the cores $C_0$ and S are energized by a clock pulse source $I_{RB}$. A winding 36 is provided on the core $C_{and}$ connected with the source $I_A$, while a winding 38 is provided on the core $C_{and}$ and a winding 40 is provided on a core $C_{or}$ connected with the source $I_{RA}$. A winding 42 is provided on the core $C_{or}$ and a winding 44 is provided on the core S which windings are connected with the source $I_B$, while a winding 46 is provided on the core S and a winding 48 on the core $C_0$ which are connected with the source $I_{RB}$.

Figure 2:
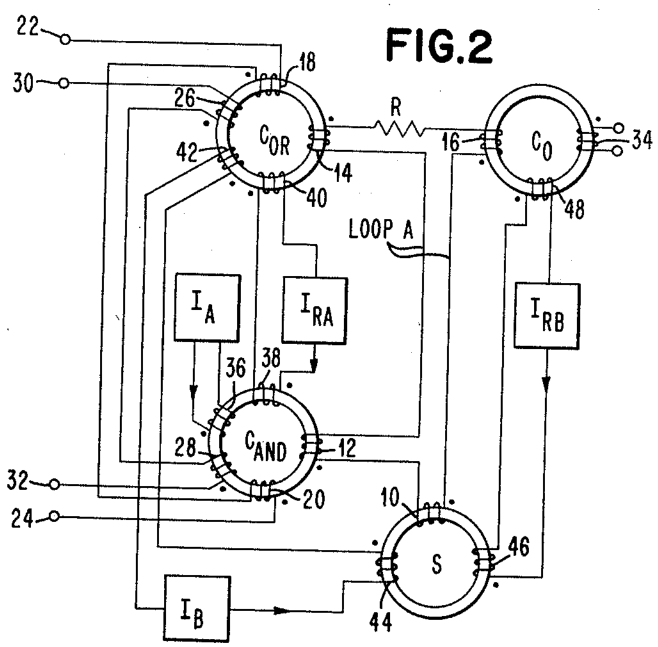
FIG. 2 is a circuit diagram illustrating one embodiment of this invention.
Figure 3:
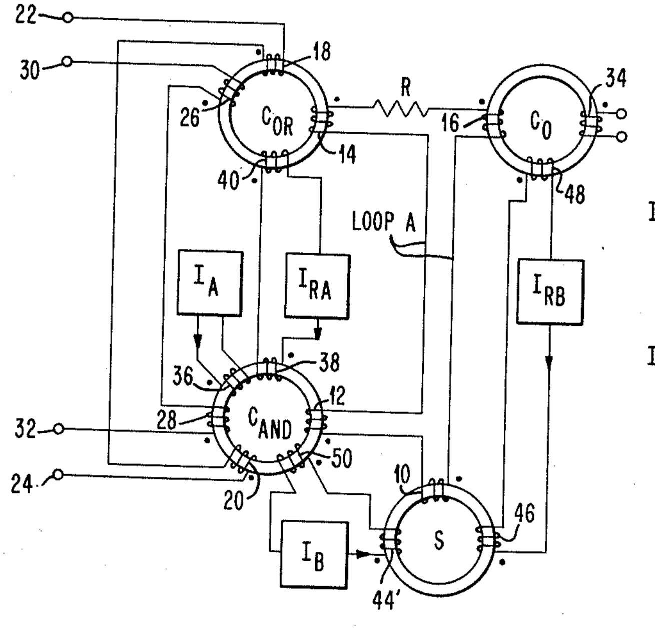
FIG. 3 is a circuit diagram illustrating another embodiment of this invention.
Figure 4:
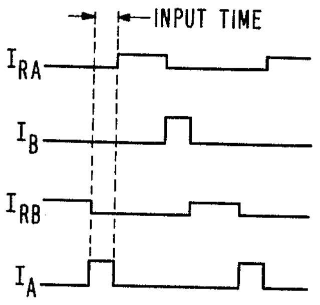
FIG. 4 is the relative timing of current pulses which are required for operation of the circuits disclosed in the FIGS. 2 and 3.

The sequence of pulses provided by the several clock pulse sources described above, is as indicated in the FIG. 4, with the time of appearance of an input signal, which is a positive signal directed into the undotted end of the input windings, shown to be the time at which the $I_A$ clock pulse source operates, and these sources are adapted to operate with the circuits shown in the FIGS. 2 and 3.

Referring to the FIG. 2, assume all cores are in the lower remanence condition or "0" state, as is shown in FIG. 1. Initially assume no input signal to be impressed across the terminals 22–24 or 30–32. Initially, the $I_A$ clock pulse source operates to direct a read signal into the winding 36 on the core $C_{and}$, which signal has no effect since the core $C_{and}$ is already in the "0" state. Next, the $I_{RA}$ clock pulse source operates to direct a read signal into the windings 38 and 40 on the cores $C_{and}$ and $C_{or}$, respectively, which signal has no effect, since both cores are already in the "0" state. Upon termination of the $I_{RA}$ clock pulse, the $I_B$ clock pulse source operates to direct a signal into the windings 42 and 44 on the cores $C_{or}$ and S, respectively, which tends to read the core $C_{or}$ and write the core S. Since the core $C_{or}$ is already in the "0" state it is uneffected, while the core S is switched from the "0" to the "1" state. The core S in switching to the "1" state, induces a voltage on the control winding 10 with its undotted end positive causing a clockwise current flow in loop A, which tends to read the core $C_{and}$ and tends to write the cores $C_{or}$ and $C_0$. Since the core $C_{and}$ is already in the "0" state, while the core $C_{or}$ is held in the "0" state by the $I_B$ clock pulse applied to its winding 42, the core $C_0$ is switched from the "0" to the "1" state. The core $C_0$ in switching to the "1" state induces a voltage on the output winding 34. Upon termination of the $I_B$ clock pulse, the $I_{RB}$ clock pulse source operates to direct a read signal into the windings 46 and 48 on the cores S and $C_0$, respectively. The cores S and $C_0$ are switched from the "1" to the "0" state and in so doing induce a voltage on their windings 10 and 16 respectively. The induced voltages on the windings 10 and 16 are approximately equal and opposite therefore cancelling to provide very little current in loop A. Upon termination of the $I_{RB}$ clock pulse, all cores are left in the "0" state, readying the circuit for the next cycle of operation, and an output signal has been engendered with the absence of input signals to the circuit.

Application of an input signal to the terminals 22–24 or 30–32 provides a write signal into the windings 18 and 20 on the cores $C_{or}$ and $C_{and}$, or into the windings 26 and 28, respectively. Simultaneous with the application of the input signal, the $I_A$ clock pulse source operates to direct a read signal into the winding 36 on the core $C_{and}$, which signal negates the write signal applied by the input to the winding 20 or 28 on the core $C_{and}$. The core $C_{or}$ is switched from the "0" to the "1" state and in so doing induces a voltage on the winding 14 with the undotted end positive causing a counter-clockwise current in loop A which tends to write the core $C_{and}$ and S while tending to read the core $C_0$. Since the core $C_0$ is already in the "0" state and the core $C_{and}$ is held in the "0" state by the $I_A$ clock pulse applied to its winding 36, only the core S is switched from the "0" to the "1" state. Next, the $I_{RA}$ clock pulse source operates to direct a read signal into the windings 38 and 40 on the cores $C_{and}$ and $C_{or}$.

The core $C_{or}$ is reset from the "1" to the "0" state and in so doing induces a voltage on the winding 14 with the dotted end positive causing a clockwise current in loop A. Resetting of the core $C_{or}$ is performed at a sufficiently slow rate so that the voltage appearing across its output winding 14 and the value of the resistor R causes a small current flow insufficient to affect the states of the other cores coupled to the loop. Upon termination of the $I_{RA}$ clock pulse, all cores but the core S are left in the "0" state and the $I_B$ clock pulse source operates to direct a signal into the windings 42 and 44 on the cores $C_{or}$ and S, respectively, which tends to read the core $C_{or}$ and write the core S, but since the core $C_{or}$ is already in the "0" state and the core S is already in the "1" state, there is negligible flux change. Subsequently, the $I_{RB}$ clock pulse source operates and directs a read signal into the windings 46 and 48 on the cores S and $C_0$. The core S is then reset from the "1" to the "0" state slowly, to induce a voltage on the control winding 10 with the dotted end positive causing a counter-clockwise current flow in loop A which has no effect due to the slow resetting of the S by the $I_{RB}$ clock pulse which causes insufficient current flow in the loop A as similarly described above for resetting of the core $C_{or}$ by the $I_{RA}$ clock pulse. Upon termination of the $I_{RB}$ clock pulse, all cores are left in the "0" state readying the circuit for the next cycle of operation and there has been no output signal with an input directed into the terminals 22–24. Consider an input directed across the terminals 22–24 and another input directed across the terminals 30–32. A write signal is then directed into the windings 18 and 20 on the cores $C_{or}$ and $C_{and}$, respectively, while similarly, a write signal is directed into the windings 26 and 28 on the cores $C_{or}$ and $C_{and}$, respectively. Simultaneously with the input signals, the $I_A$ clock pulse source directs a read signal into the winding 36 on the core $C_{and}$. In this case, since both the windings 20 and 28 on the core $C_{and}$ are energized, the bias applied by the $I_A$ clock pulse to the winding 36 is overcome and the core $C_{and}$ is switched from the "0" to the "1" state. The core $C_{or}$, is also switched from the "0" to the "1" state to induce a voltage on the winding 14 with the undotted end positive while similarly the core $C_{and}$ in switching from the "0" to the "1" state induces a voltage on the output winding 12 with its undotted end positive. The induced voltages on the windings 12 and 14, on the cores $C_{and}$ and $C_{or}$, respectively, are approximately equal and their algebraic sum is effectively zero causing little current flow in loop A. Upon termination of the $I_A$ clock pulse and the input signals, the cores $C_{or}$ and $C_{and}$ are left in the "1" state while the cores S and $C_0$ are left in the "0" state. Subsequently, the $I_{RA}$ clock pulse source operates to direct a read signal into the windings 38 and 40 on the cores $C_{and}$ and $C_{or}$, respectively, which cores reset from the "1" to the "0" state to induce a voltage on their output windings 12 and 14, respectively. The induced voltage on the windings 12 and 14, on the cores $C_{and}$ and $C_{or}$, respectively, are effectively equal and opposite and therefore cancel allowing very little current flow in loop A. Upon termination of the $I_{RA}$ clock pulse, the $I_B$ clock pulse source operates to direct a signal into the windings 42 and 44 on the cores $C_{or}$ and S, which signal writes the core S from the "0" to the "1" state causing a voltage to be induced on the control winding 10 with its undotted end positive causing a clockwise current flow in loop A. The current flow in loop A due to the induced voltage on the winding 10 tends to read the core $C_{and}$ and to write the cores $C_{or}$ and $C_0$. Since the core $C_{and}$ is already in the "0" state and the core $C_{or}$ is held in the "0" state due to the $I_B$ pulse applied to its winding 42, the core $C_0$ is switched from the "0" to the "1" state to induce a voltage on its winding 34. Upon termination of the $I_B$ clock pulse, the $I_{RB}$ clock pulse source operates to direct a read signal into the windings 46 and 48 on the cores S and $C_0$, respectively, which resets the cores S and $C_0$ from the "1" to the "0" state. The cores S and $C_0$ in resetting induce a voltage on their windings 10 and 16 respectively, with their dotted end positive, which voltages are approximately equal and opposite causing little current flow in loop A. Thus, upon application of an input signal to the terminals 22–24 and 30–32 an output signal is delivered and all cores are left in the "0" state readying the circuit for the next cycle of operation. Since the circuit has delivered an output signal when none of the input signals were available or when both input signals were available, the logical operation of "Equals" has been performed.

From the circuit description and operation as described above, it may be seen that by providing a signal which switches the core S to the "1" state, in every cycle of operation, that whenever the core S is left in the "0" state, immediately prior to the application of this signal, an output is engendered. By utilizing the same type of input mode, but providing the converse of switching signal to the core S, i.e. instead of switching the core S to the "1" state switch it to the "0" state, then an output signal is provided whenever the core S is left, immediately prior to the application of the switching signal, in the "1" state. Referring to the FIGS. 2 and 3, it may be seen that the winding 42 on the core $C_{or}$ in the FIG. 2 has been eliminated and a winding 50 on the core $C_{and}$, in the FIG. 3, has been added. The windings 44 and 16 on the cores S and $C_0$, in the FIG. 2, are wound opposite in sense in the FIG. 3 and are primed to denote this difference, and the winding 50 on the core $C_{and}$ is connected with the winding 44' on the core S and the clock pulse source $I_B$. As described subsequently, this slight variation in winding arrangement allows performance of the logical operation of Exclusive OR.

Referring again to the FIG. 3, assume an absence of inputs to the terminals 22–24 or 30–32. Initially the $I_A$ clock pulse source operates to direct a read signal into the winding 36 on the core $C_{and}$, which has no effect since the core $C_{and}$ is already in the "0" state. Upon termination of the $I_A$ clock pulse, the $I_{RA}$ clock pulse source operates to direct a read signal into the windings 38 and 40 on the cores $C_{and}$ and $C_{or}$, respectively, which, has no effect, since both cores are already in the "0" state. Next, the $I_B$ clock pulse source operates to direct a read signal into the windings 50 and 44' on the cores $C_{and}$ and S, respectively, which has no effect since the cores $C_{and}$ and S are already in the "0" state. Subsequently, the $I_{RB}$ clock pulse source operates to direct a read signal into the windings 46 and 48 on the cores S and $C_0$, respectively, which signal has no effect since both cores are already in the "0" state. Thus, with no input applied to the circuit, there is no signal output and all cores are left in the "0" state readying the circuit for the next cycle of operation.

Assume an input signal is impressed across either set of terminals 22–24 or 30–32. If the input signal is directed across the terminals 22–24, a write signal is directed into the windings 18 and 20 on the cores $C_{or}$ and $C_{and}$, while, if an input signal is impressed across the terminals 30–32, a write signal is directed into the windings 26 and 28 on the cores $C_{or}$ and $C_{and}$, respectively. Simultaneous with application of the input signal, the $I_A$ clock pulse source directs a read signal into the winding 36 on the core $C_{and}$ which negates any one of the windings 28 or 20 having a write signal impressed thereon. The core $C_{or}$, due to the write signal directed into its winding 18 or 26, is switched from the "0" to the "1" state to induce a voltage on the winding 14 with its undotted end positive. The induced voltage on the winding 14 due to the core $C_{or}$ switching, causes a counter-clockwise current in loop A, which tends to write the cores $C_{and}$, S and $C_0$. Since the core $C_{and}$ is held in the "0" state due to the $I_A$ clock pulse applied to its winding 36, and the winding 16' has insufficient turns for this current to induce enough flux to shift the state of core $C_0$, only the core S is switched from the "0" to the "1" state. Upon termination of the $I_A$ clock pulse and any one of the inputs, the $I_{RA}$ clock pulse source operates to direct a read signal into the windings 38 and 40 on the cores $C_{and}$ and $C_{or}$ which resets the core $C_{or}$ from the "1" to the "0" state slowly. The core $C_{or}$ in resetting to the "0" state induces a voltage on the winding 14 with its dotted end positive causing a clockwise current flow in loop A which has little effect due to the slow resetting of the core $C_{or}$. Next, the $I_B$ clock pulse source operates to direct a read signal into the winding 44' on the core S, which resets the core S from the "1" to the "0" state to induce a voltage on the control winding 10 with the dotted end positive. The induced voltage on the winding 10 due to the core S resetting to the "1" state, causes a counter-clockwise current flow in the loop A, which tends to write the cores $C_0$ and $C_{and}$ while tending to read the core $C_{or}$. Since the core $C_{or}$ is already in the "0" state and the core $C_{and}$ is held in the "0" state due to the $I_B$ clock pulse applied to its winding 50, the core $C_0$ is switched from the "0" to the "1" state. The core $C_0$ in switching from the "0" to the "1" state, induces a voltage on the winding 34 with its undotted end positive which may be utilized by further circuitry connected thereto. Upon termination of the $I_B$ clock pulse, the $I_{RB}$ clock pulse source operates to direct a read signal into the windings 46 and 48 on the cores S and $C_0$, respectively, which resets the core $C_0$ from the "1" to the "0" state. The core $C_0$, in resetting from the "1" to the "0" state, induces a voltage on the winding 16' with its dotted end positive causing a counter-clockwise current in loop A which has no effect due to its slow resetting by the $I_{RB}$ clock pulse. Upon termination of the $I_{RB}$ clock pulse, all cores are left in the "0" state, readying the circuit for the next cycle of operation.

Assume an input signal is directed across the terminals 22–24, and an input signal is also directed across the terminals 30–32. These input signals direct a write signal into the windings 18 and 26 on the core $C_{or}$ and a write signal into the windings 20 and 28 on the core $C_{and}$. Simultaneously, the $I_A$ clock pulse source directs a read signal into the winding 36 on the core $C_{and}$, which signal is overcome by the simultaneous energization of the windings 28 and 20 which cause the core $C_{and}$ to switch from the "0" to the "1" state. The core $C_{or}$ and $C_{and}$ in switching from the "0" to the "1" state induce a voltage on their windings 14 and 12, respectively, with their undotted end positive, which voltages are approximately equal and opposite to effectively cancel. After application of the $I_A$ clock pulse and the input signals, the $I_{RA}$ clock pulse source operates to direct a read signal into the windings 38 and 40 on the cores $C_{and}$ and $C_{or}$, respectively, which signal resets both cores from the "1" to the "0" state to induce a voltage on their output windings 12 and 14, respectively, which voltages are equal and opposite to effectively cancel. Upon termination of the $I_{RA}$ clock pulse, the $I_B$ clock pulse source operates to direct a read signal into the windings 44' and 50 on the cores S and $C_{and}$, respectively, which signal has no effect since both cores are already in the "0" state. Similarly, subsequent operation of the $I_{RB}$ clock pulse source which directs a read signal into the windings 46 and 48 on the cores S and $C_0$, respectively, has no effect, since both these cores are already in the "0" state. All cores are left in the "0" state and upon application of both inputs to the circuit there is provided no output signal. Since an output from the circuit has been provided only when one or the other input is applied, the circuit has performed the logical operation of Exclusive OR.

In the interest of providing a complete disclosure details of one embodiment of the logical device wherein magnetic cores are employed is given below, however, it is to be understood that other component values and current magnitudes may be employed with satisfactory operation attained so that the values given should not be considered limiting.

With the clock pulse currents $I_A$ and $I_B$ delivering a constant current of 1.8 amperes, the windings 36, 42 and 50 may comprise one turn and the winding 44 may comprise three turns. With the clock pulse sources $I_{RA}$ and $I_{RB}$ delivering a constant current of 1.25 amperes, the winding 46 may comprise three turns and the windings 38, 40 and 48 may comprise two turns. In the transfer loop interconnecting the coupling and storage cores, the output windings 12, 14 and 34 may comprise twelve turns, the winding 10 may comprise ten turns and the windings 16, 20, 26 and 28 may comprise five turns with the resistor R of 6 ohms.

Each of the storage and coupling cores may comprise toroids of magnesium-manganese ferrite composition having an outside diameter of 0.115 inch, inside diameter of 0.080 inch, and a thickness of 0.055 inch.

While there have been shown and described and pointed out the fundamental novel features of the invention as applied to a preferred embodiment, it will be understood that various omissions and substitutions and changes in the form and details of the device illustrated in its operation may be made by those skilled in the art without departing from the spirit of the invention. It is the intention therefore, to be limited only as indicated by the scope of the following claims.

What is claimed is:

1. A logical Exclusive OR device comprising, a storage magnetic core, a first, a second and a third coupling magnetic core, each of said cores capable of attaining bistable states of residual flux density, control winding means on said storage core, input and output winding means on each of said coupling cores, circuit means serially connecting the output winding means on said first core in opposite sense with the output winding means on said second core and connecting the control winding means on said storage core with the input winding means on said third coupling core, means connecting a first input winding on each of said first and second coupling cores, means connecting a second input winding on each of said first and second coupling cores, shift winding means on said second coupling core connected with a first clock pulse source, shift winding means on said first coupling core series connected with shift winding means on said second coupling core adapted to be energized simultaneously from a second clock pulse source, further shift winding means on said second coupling core series connected with shift winding means on said storage core adapted to be energized simultaneously from a third clock pulse source, and shift winding means on said storage core series connected with shift winding means on said third coupling core adapted to be energized from a fourth clock pulse source.

2. A logical Exclusive OR device comprising, a storage magnetic core, a first and a second input coupling core, an output coupling core, each of said cores capable of attaining bistable states of residual flux density, control winding means on said storage core, input and output winding means on each of said coupling cores, circuit means including a resistor serially connecting the output winding means on said first input coupling core opposite in sense with the output winding means on said second input coupling core and the control winding means on said storage core and the input winding means on said output coupling core, said input winding means on said first and second coupling core comprising a first input winding on each of said input coupling cores serially connected and a second input winding on each of said cores serially connected, shift winding means on said second input coupling core connected with a first clock pulse source adapted to cause said second input coupling core to be biased to a datum residual state when energized in the presence of a signal on only one of said input windings, said second input coupling core being operable in the presence of signals on both of said input windings to shift to an information representative stable state over the opposition of the bias of said shift winding means, further shift winding means on said first input coupling core connected with shift winding means on said second input coupling core and connected with a second clock pulse source adapted to cause said first and second input coupling cores to shift to said datum residual state when energized, additional shift winding means on said second input coupling core connected with shift winding means on said storage core and a third clock pulse source adapted to cause said second input coupling core and said storage core to shift to said datum residual state when energized, and shift winding means on said storage core connected with shift winding means on said output coupling core adapted to energize simultaneously from a fourth clock pulse source and cause said storage core and said output coupling core to be shifted to said datum residual state.

3. A device as set forth in claim 2, including means for energizing said shift winding means including said first, second, third and fourth clock pulse sources, wherein said sources are actuated in sequence in the order named.

4. A logical Equals device comprising, a storage magnetic core, a first and a second input coupling core, an output coupling core, each of said cores capable of attaining bistable states in representing binary information, control winding means on said storage core, input and output winding means on each of said coupling cores, said input winding means on said first and second input coupling cores comprising a first and a second input winding wherein the first winding on each of said input cores are serially connected and the second winding on each of said input cores are serially connected, circuit means connecting the output winding means on said first input coupling core in opposite sense with the output winding means on said second input coupling core and the control winding means on said storage core with the input winding means on said output coupling core, shift winding means on said second input coupling core adapted to be energized from a first clock pulse source to bias and maintain said second input coupling core in a datum bistable state in the presence of a signal on only one of said input windings, said second input coupling core being operable in the presence of signals on both of said input windings to shift to an information representative stable state over the opposition of the bias of said shift winding means, further shift winding means on said second input coupling core corrected with shift winding means on said first input coupling core adapted to be energized from a second clock pulse source and cause said first and said second input coupling core to shift to said datum bistable state, further shift winding means on said first input coupling core connected with shift winding means on said storage core adapted to be energized from a third clock pulse source and cause said first input coupling core to shift to said datum bistable state and said storage core to shift to an opposite bistable state, and shift winding means on said storage core connected with shift winding means on said output coupling core and a fourth clock pulse source to cause said storage core and said output coupling core to shift to said datum bistable state when energized.

5. A device as set forth in claim 4, including means for energizing said shift winding means including said first, second, third and fourth clock pulse sources wherein said sources are actuated in sequence in the order named.

6. A magnetic core logical circuit for receiving two input signals and for delivering an output signal indicative of the correspondence between said input signals comprising an OR core and an AND core each having an input winding for receiving each of said input signals, said AND core having a bias shift winding and a pulse source connected thereto and operable when input signals are received on said input windings to maintain said AND core in a datum stable state in the presence of no more than one input signal, such bias having a magnitude which is overcome to shift said AND core to an information representative stable state in the presence of two input signals, said OR core being shiftable from the datum state to the information representative state in response to at least one input signal, a storage core having a control winding, said OR core and said AND core having output windings serially connected in opposition and connected in circuit with said storage core control winding and operative to shift said storage core to an information representative state only when said OR core is shifted to an information representative state while said AND core is maintained in said datum stable state, and apparatus for detecting the state of said storage core to indicate the correspondence between said input signals.

7. A logical device comprising, a storage magnetic core, first and second input magnetic cores, an output magnetic core, each of said cores being capable of attaining bistable states of residual flux density, control winding means on said storage core, input and output winding means on each of said input and output cores, circuit means serially connecting the output winding means on said first input core in opposite sense with the output winding means on said second input core and connecting the control winding means on said storage core with the input winding means on said output core, means connecting a first input winding on each of said first and second input cores, means connecting a second input winding on each of said first and second input cores, shift winding means on said second coupling core connected with a first clock pulse source, shift winding means on said first coupling core series connected with shift winding means on said second coupling core adapted to be energized simultaneously from a second clock pulse source, further shift winding means on one of said input cores series connected with shift winding means on said storage core adapted to be energized simultaneously from a third clock pulse source, and shift winding means on said storage core series connected wtih shift winding means on said output core adapted to be energized from a fourth clock pulse source.

8. A logical device comprising, a storage magnetic core, a first and a second input coupling core, an output coupling core, each of said cores being capable of attaining bistable states of residual flux density, control winding means on said storage core, input and output winding means on each of said coupling cores, circuit means including a resistor serially connecting the output winding means on said first input coupling core opposite in sense with the output winding means on said second input coupling core and the control winding means on said storage core and connecting with the input winding means on said output coupling core, said input winding means on said first and second coupling cores comprising a first input winding on each of said input coupling cores serially connected and a second input winding on each of said cores serially connected, shift winding means on said second input coupling core connected with a first clock pulse source adapted to cause said second input coupling core to be biased to a datum residual state when energized in the presence of a signal on only one of said input windings, said second input coupling core being operable in the presence of signals on both of said input windings to shift to an information representative stable state over the opposition of the bias of said shift winding means, further shift winding means on said first input coupling core connected with shift winding means on said second input coupling core and connected with a second clock pulse source adapted to cause said first and second input coupling cores to shift to said datum residual state when energized, additional shift winding means on one of said input coupling cores connected with shift winding means on said storage core and a third clock pulse source, and shift winding means on said storage core connected with shift winding means on said output coupling core connected for energization from a fourth clock pulse source to cause said storage core and said output coupling core to be shifted to said datum residual state.

References Cited in the file of this patent

UNITED STATES PATENTS

| | | |
|---|---|---|
| 2,666,151 | Rajchman | Jan. 12, 1954 |
| 2,846,667 | Goodell et al. | Aug. 5, 1958 |
| 2,861,259 | Myerhoff | Nov. 18, 1958 |
| 2,889,543 | Bloch et al. | June 2, 1959 |
| 2,966,663 | Leblais | Dec. 27, 1960 |